FIG. 1.

March 23, 1943. P. E. PEARSON 2,314,515
APPARATUS FOR INTERNALLY COATING CONTAINERS
Filed Aug. 15, 1938 9 Sheets-Sheet 3

Inventor
Paul E. Pearson
By Mason & Porter

March 23, 1943. P. E. PEARSON 2,314,515
APPARATUS FOR INTERNALLY COATING CONTAINERS
Filed Aug. 15, 1938 9 Sheets-Sheet 6

March 23, 1943. P. E. PEARSON 2,314,515
APPARATUS FOR INTERNALLY COATING CONTAINERS
Filed Aug. 15, 1938 9 Sheets-Sheet 8

Inventor
Paul E. Pearson
By Mason & Porter
Attorney.

Patented Mar. 23, 1943

2,314,515

UNITED STATES PATENT OFFICE 2,314,515

APPARATUS FOR INTERNALLY COATING CONTAINERS

Paul E. Pearson, Chicago, Ill., assignor to Continental Can Company, Inc., New York, N. Y., a corporation of New York Application August 15, 1938, Serial No. 225,040

15 Claims. (Cl. 91—45)

The invention relates generally to the art of coating, and primarily seeks to provide a novel apparatus for spraying the insides of containers intended for the packaging of products for the market, with a suitable protective coating material.

Many products, such as beer, wine, carbonated water, grape juice, and cranberry juice, cannot be packaged in metal cans unless a protective coating or lining is employed to completely insulate the products from the metal of the cans and prevent contact with the tinned surfaces thereof. The invention therefore seeks to provide a novel apparatus for spraying a smooth and evenly distributed protective coating onto the interior surfaces of such containers.

In its more detailed nature, the invention resides in the provision of a novel pocketed turret which is indexed, station by station, about an axis on which it is mounted, novel means for feeding containers one by one into the turret pockets, novel means for rotating the containers in the pockets, novel spray means movable into and out of the containers at one station for effecting the desired coating of the containers, and novel means operable at another station for sucking out vapor left suspended in the containers during the spraying operation.

Another object of the invention is to provide novel spray controlling means including devices for preventing operation of the spray when no container is in position to be sprayed.

Another object of the invention is to provide a novel means positioned at one station only for imparting rotation to the containers.

Another object of the invention is to provide a novel turret structure and housing therefor.

Another object of the invention is to provide novel means for simultaneously imparting movement to the spray head and the vapor removing means.

With the above and other objects in view that will hereinafter appear, the nature of the invention will be more clearly understood by following the detailed description, the appended claims, and the several views illustrated in the accompanying drawings.

In the practical development of the invention I provide a base 5 on which are removably mounted a spray housing 6, a gear and cam housing 7, a motor supporting bracket 8 and a bearing bracket 9.

The housing 6 provides a substantially complete closure for enclosing the spraying operation, but includes openings 10 at top and bottom to permit ingress of air. This housing includes an opening in its front face which is closed by hinged cover 11. See Figures 1 and 2 of the drawings. The housing 6 also includes a can feed housing 12 formed of two half portions and secured as at 13 upon the housing 6 as shown in Figure 2. The feed housing includes an entrance for feed channel 14 through which open-ended can bodies 15 are fed, and a timing screw 16 is rotatably mounted in a lateral offset portion of the housing in upper and lower bearings 17. The screw 16 perfectly times the delivery of the can bodies 15 one by one into the receiving pockets of the turret, to be hereinafter described, and rotation is imparted to this screw through suitable bevel gears 18 from a driver shaft 19 rotatably supported on the upper end of the housing 12 and to which rotation is imparted through sprocket and chain connections 20 from a driver shaft 21 rotatably supported in the bracket 9, hereinbefore referred to. See Figures 1, 2, 3 and 4.

At its delivery end, the screw 16 includes a flattened face portion 22. Also, opposed to the can engaging surface of the screw is a vane 23 which is pivotally supported in the housing 12, as at 24, and yieldably engaged with the can bodies by a counter-weight 25. This vane serves to prevent crowding and jamming of the can bodies in the feed housing.

A turret 27 is mounted for station-by-station rotation within the housing 6, the rotation being in a vertical plane above a horizontal axis. The turret is secured as at 27 upon one end of a horizontal drive shaft 28 rotatable in a bearing 29 formed in the housing 6, and in a bearing 30 provided in the housing 7.

The turret is constructed to provide six equidistantly spaced peripheral pockets 31, each equipped with three pairs or sets of can body supporting rollers 32. See Figures 2, 3 and 6 of the drawings. The rollers preferably are constructed of rubber, and each is rotatable about an anti-friction bearing 33. The driving connections for the can feeding screw 16 and the indexing mechanism for the turret 26 are so timed that the screw will deposit a can body in a pocket of the turret positioned at the delivery end of the screw each time the turret comes to rest at one of its station positions. It will be noted by reference to Figure 2 of the drawings that the can bodies are fed into the turret pockets at a station just ahead of the vertical. When the can body is moved to the spraying station by a single indexing movement of the turret, it there has rotation imparted to it in a manner soon to be described, and at this station, and at all points within the casing between the receiving station and the discharging station, the can bodies are guided and held in the turret pockets 31 by guide ribs 34. See Figures 2 and 3.

Rotation is imparted to the can body indexed to the uppermost or spray station in the turret at approximately 1800 R. P. M. by a rubber disk 35 secured upon a shaft 36 rotatably in bearings 37 in a mounting bracket 38 secured upon the housing 6. See Figures 2 and 3 of the drawings. In order to compensate for wear and to permit use of disks 35 of varied sizes, the bracket 38 is vertically adjustably mounted by slot and screw equipments 39. An end 40 of the shaft extends beyond the housing and the bracket 38 and is connected by a shaft length 41 and universal couplings 42 with a driver shaft 43 rotatably supported in the bearings 44 provided in the housing 7. Rotation is imparted to the shaft 43 through variable pitch pulley and belt transmission connections 45 from a one horsepower electric motor 46. See Figures 3 and 4.

Figure 1:
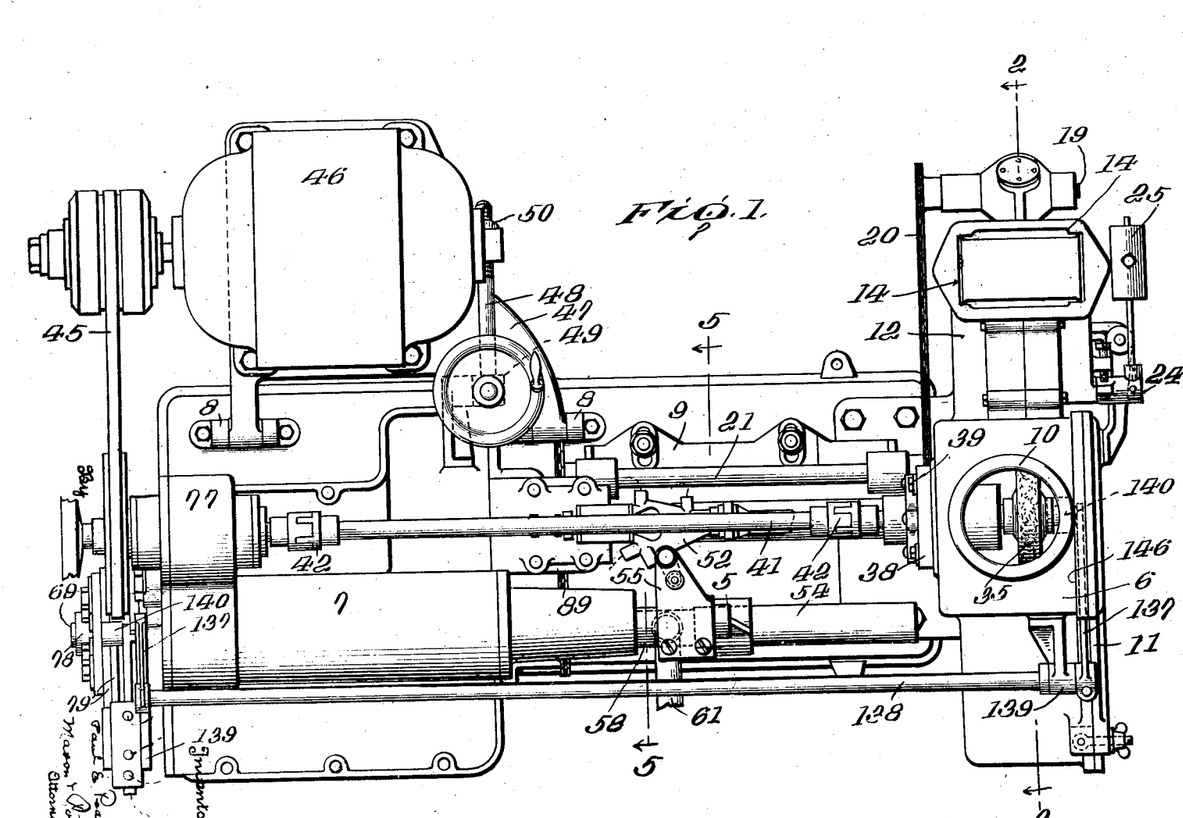
Figure 1 is a plan view of the improved coating machine.
Figure 2:
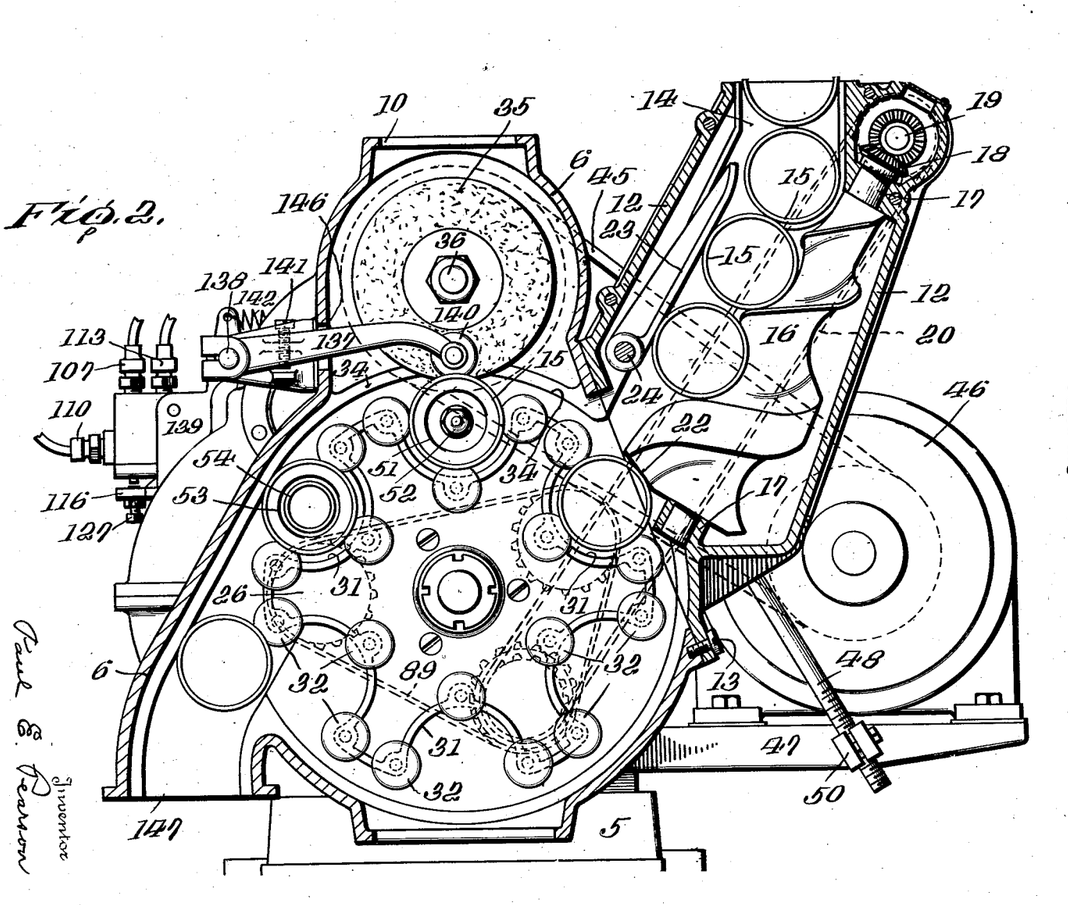
Figure 2 is a vertical cross section taken on the line 2—2 in Figure 1.
Figure 4:
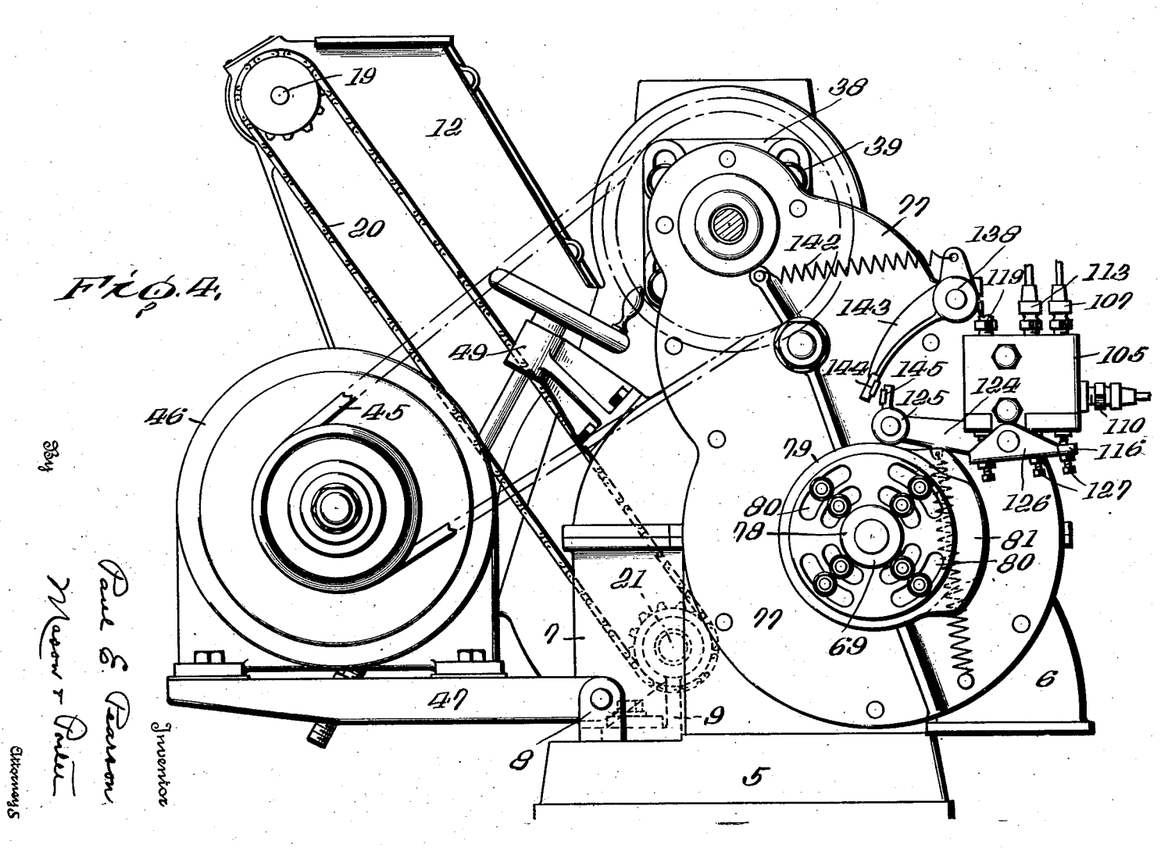
Figure 4 is a left end view, the driven pulley being broken away.
Figure 5:
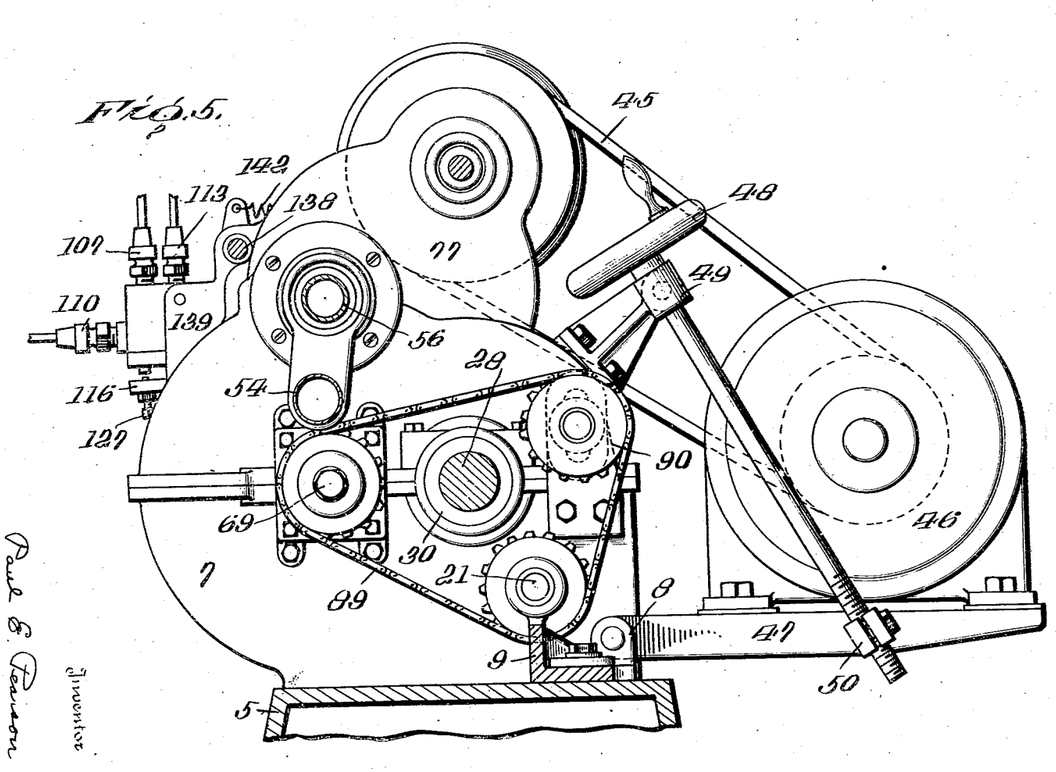
Figure 5 is a vertical cross section taken on the line 5—5 on Figure 1.

The motor 46 is secured upon a bracket 47 hinged as shown in Figures 1 and 4 to the bracket 8 hereinbefore referred to. A hand screw 48 is rotatably secured in a bracket 49 mounted on the housing 7, and at its lower end the screw is threaded through a nut 50 connected to the motor bracket 47. By rotating the screw 48 the speed of rotation imparted to the shaft 43 and other driven parts of the machine can be varied in the well known manner.

The spray housing 6 is provided at its rear face with an opening 51 for permitting projection into and withdrawal from the housing of a spray gun generally designated 52, and the housing is equipped with a similar opening 53 to permit projection and retraction into and from the housing of a suction tube 54. It will be noted that the opening 51 registers with pockets positioned at the uppermost or vertical station of the turret; and the opening 53 registers with pockets at the station following the uppermost or spray station. See Figure 2 of the drawings.

The spray gun 52 is secured by a bracket 55 to a reciprocating rod 56, said bracket being likewise clamped as at 57 to the suction tube 54, so that reciprocation of the rod 56 will simultaneously be imparted both to the spray gun generally designated 52 and to the suction tube 54. See Figures 1 and 3 of the drawings.

The suction tube 54 telescopes and is slidable on a suction duct 58 secured as at 59 to the bearing 60 supported on the housing 7 and which serves as a slide support for the rod 56. A duct 58 is connected as at 61 to an exhaust fan, (not shown).

Figure 3:
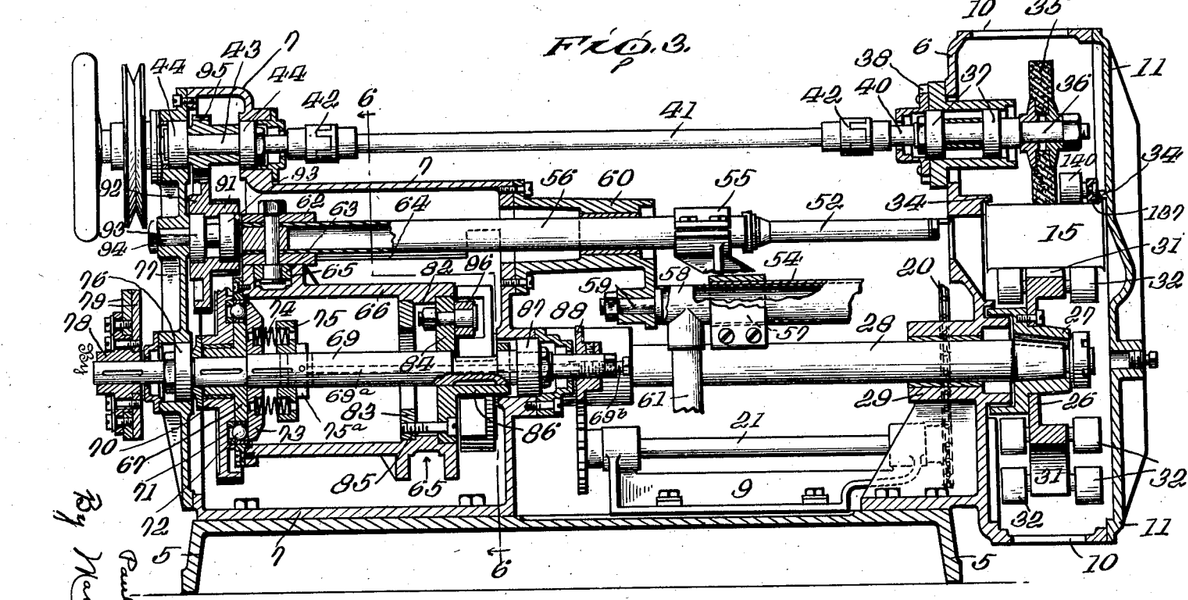
Figure 3 is a vertical longitudinal sectional view of the machine.
Figure 6:
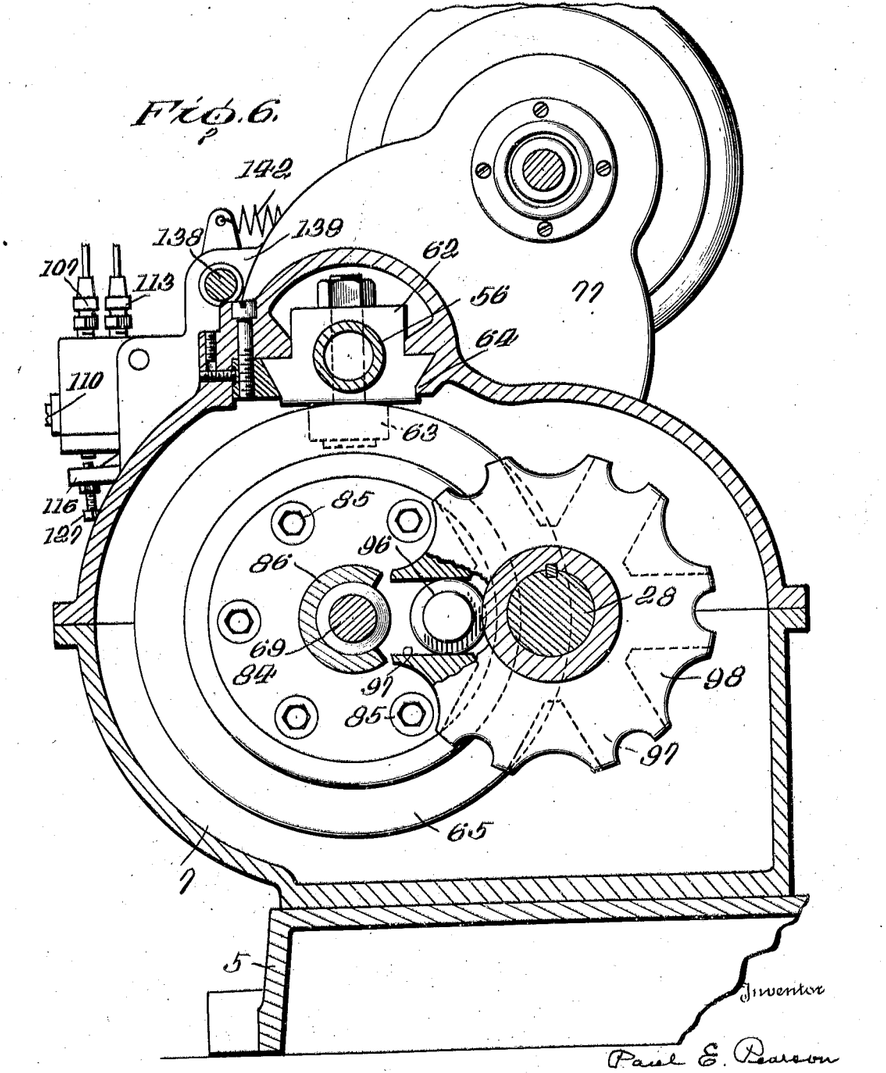
Figure 6 is a fragmentary vertical cross section taken on the line 6—6 on Figure 3.

At its rear end, the reciprocating rod 56 carries an actuator head 62 including a depending roller 63, and the head is slidably supported and guided in a slideway 64 formed in the housing, as shown in Figures 3 and 6 of the drawings.

The roller 63 engages in a cam groove 65 formed on a cylindrical cam 66, the groove being so placed that rotary movement of the cam will impart reciprocatory movement to the rod for projecting the spray gun 52 and the suction tube 54 into, and for withdrawing them from, can bodies in the turret pockets at stop intervals or station positions of the turret.

The cam 66 is hollow in construction, as shown in Figure 3 of the drawings, and has an end plate 67 secured to the rear end thereof and keyed to a driver shaft 69. A driver gear 70 is rotatably supported on a hub portion of the plate 67 and includes ball recesses 71 engaged by balls 72 mounted in openings in the plate 67. The balls 72 are yieldably held in the recesses 71 so as to cause the cam 66, the plate 67, and the gear 70 to rotate as a unit by a pressure plate 73 yieldably held in engagement with the balls by springs 74 interposed between the pressure plate and an abutment plate 75 longitudinally-adjustably mounted upon the shaft 69, as shown in Figure 3. Both plates 73 and 75 are splined to the shaft 69. A thrust rod 69a is movable axially of the shaft 69 in a bore formed therein and under control of a tappet screw 69b operable from without the housing 7, and the rod 69a engages a thrust bar 75a in contact with the plate 75. By adjusting the screw 69b the degree of pressure exerted by the springs 74 can be varied.

The shaft 69 is rotatably supported at its rear end in a bearing 76 mounted in a removable end plate 77 secured to the housing 7 and through which access may be had to the interior of the housing. The rear end of the shaft 69 is extended through the housing end plate, and a cam head 78 is secured upon this extended end. Two individual cam plates 79 are relatively adjustably mounted upon the head 78 through the medium of slot and screw equipments 80, and each cam plate includes a crest portion 81. It will be observed by reference to Figure 4 of the drawings that the crest portions 81 are concentric with the axis of the shaft and are of like diameter, and by adjusting one plate relatively to the other and about the axis of the shaft 69 the length of effective crest surface can be readily adjusted.

At its inner end the cylinder cam 66 is equipped with an inwardly extending rib 82 which is gripped between a clamp ring 83 and a plate 84, through the medium of clamp screws 85. It will be noted by reference to Figures 3 and 6 of the drawings that the plate 84 closes the front end of the cam 66, and this plate includes a forwardly extended Geneva lock 86, the purpose for which will later become apparent.

The forward end of the shaft 69 is rotatable in the bearing 87 supported in the front wall of the housing 7, and this end of the shaft is extended beyond the housing and has secured thereon a sprocket 88 from which the rotation of the shaft 69 is imparted to the shaft 21, hereinbefore referred to, through sprocket and chain connections 89. An adjustably mounted slack take-up idler sprocket 90 is provided for maintaining the chain 89 in a suitably tight condition.

Rotation is imparted to the cylinder cam 66 by a pinion 91 formed on an idler gear 92 rotatable about the bearings 93 on a stud 94 secured to the cover plate 77. The idler 92 is in turn driven by a pinion 95 secured upon the shaft section 43 to which rotation is imparted directly from the motor 46, as hereinbefore described.

The plate 84 closing the end of the cylinder cam 66 also carries a Geneva movement roller 96 positioned to successively engage in the star grooves 97 formed radially in the six-station Geneva wheel 98 secured upon the turret shaft 28. See Figures 3 and 6 of the drawings. By reason of the provision of this equipment, the turret 26 will be indexed or given one step of movement for each complete rotation of the cylinder cam 66, this movement of the turret taking place while the spray gun 52 and suction tube are withdrawn from the spray housing 6, as shown in Figure 3 of the drawings.

Figure 9:
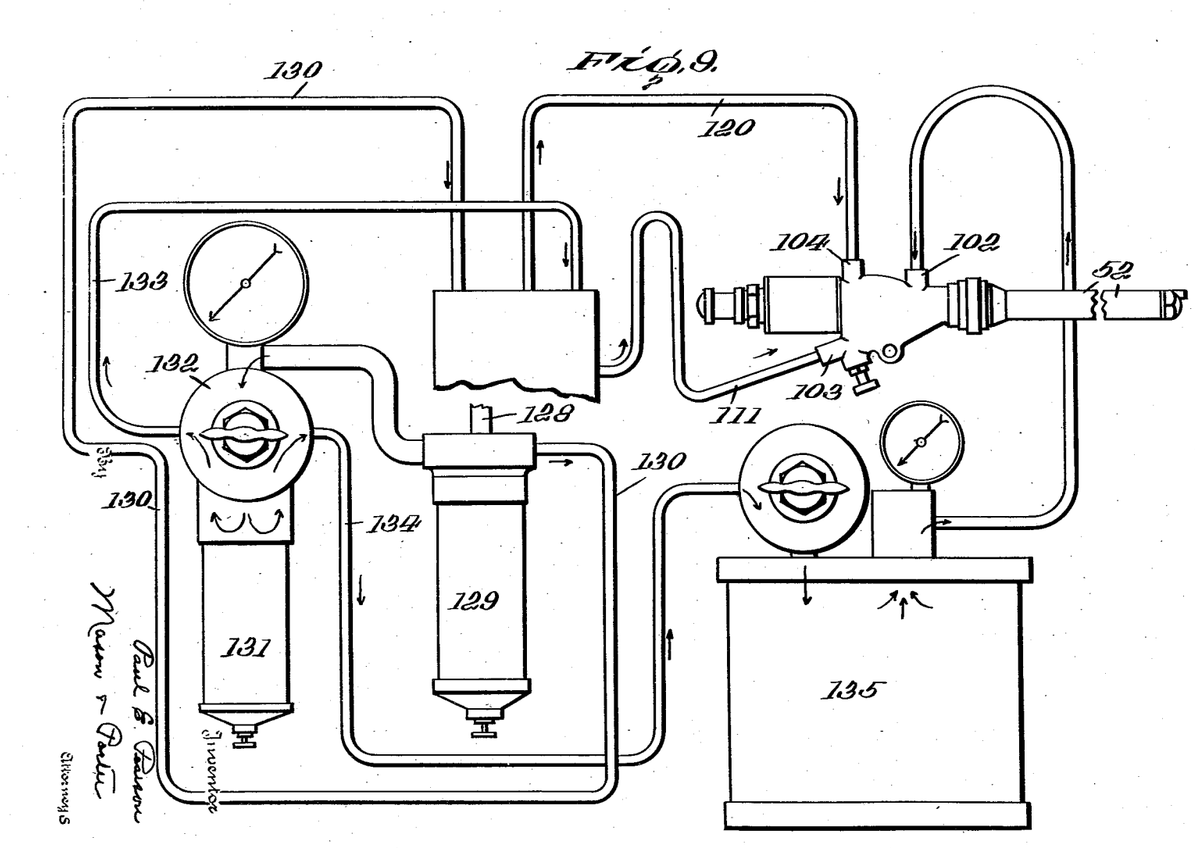
Figure 9 is a diagrammatic view illustrating the spray gun, and the connections between the gun, the air and coating material sources, and the control valves being diagrammatically shown.
Figure 10:
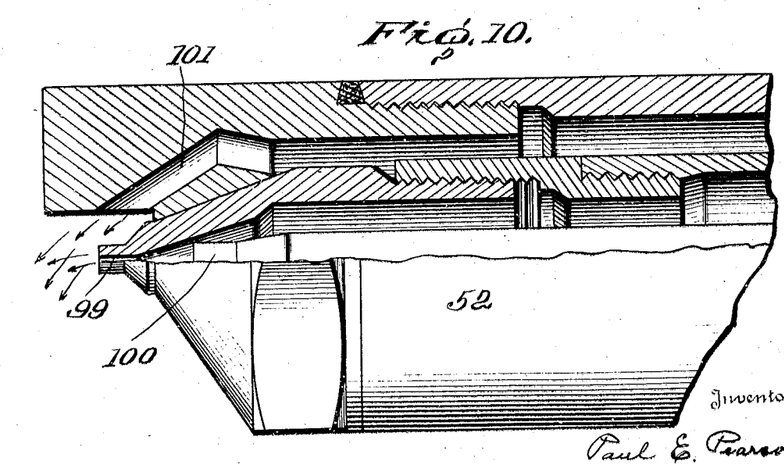
Figure 10 is an enlarged fragmentary sectional view and part elevation of the discharge end of the spray gun.

The spray gun, generally designated 52, is shown in detail in Figure 9 of the drawings, and includes a central spray orifice, controlled by a spring seated, air unseated needle valve 100, and a laterally and angularly positioned atomizing air orifice 101 through which air for atomizing the coating material ejected through the spray orifice 99 is projected. Coating fluid is admitted to the gun for ejection through the orifice 99 through an inlet connection 102, atomizing air through an inlet connection 103, and air for unseating the needle valve through an inlet connection 104. The spray gun herein described is of conventional form, and it is to be understood that any suitable form of spray gun can be employed. For this reason, it is thought that further detailed description of the gun or spray head is unnecessary.

A valve equipment is provided for controlling the spraying operation, and this equipment is generally designated 105. The valve includes an atomizing air chamber 106 fed through a connection 107 and controlled by a spring-seated valve 108 including a tappet 109 by which it can be unseated to permit air to flow out of the valve casing through a discharge connection 110 connected by a pipe line 111 to the spray gun connection 103.

The valve casing also includes a needle valve control air chamber 112 fed through a connection 113 and controlled by a spring seated valve 114 including a tappet 115 by which it can be unseated. The tappets 109 and 115 are actuated to unseat the valves with which they are connected in unison in a manner later to be described.

The valve casing includes a pair of depending bearing ears 116, and it will be noted that the tappets 109 and 115 are disposed at one side of the axis of these ears. In the casing and at the other side of the axis of the ears the valve is provided with another chamber 117 connected by a duct 118 with the space below the valve 114, and this chamber has an outlet connection 119 which is connected by a pipe line 120 with the connection 104 of the spray gun. The chamber 117 communicates with a bleed port 121 under control of a spring pressed valve 122 including an unseating tappet 123. The actuator lever 124 is fulcrumed in the ears 116. At one end the lever carries a roller 125 which is spring held in contact with the peripheral surface of the cam compositely formed by the individually adjustable plates 79. At its other end the lever carries a valve actuator head 126 equipped with adjustable screws 127 positioned for engaging and actuating the valves 109, 115 and 123. It will be noted that when the roller 125 rides the crest 81 of the control cam the single valve tappet 123 will be elevated to unseat its valve, and the companion tappets 109 and 115 will be in their normal valve seated positions. When the roller 125 rides down off the cam crest the relative positions of the valves at opposite sides of the fulcrum of the lever will be reversed and the tappet 123 will be lowered to close its valve and the tappets 109 and 115 will be lifted to unseat their valves.

In Figure 9 I have illustrated the spray gun in detail and have indicated diagrammatically, connection of the control valves and the gun with the coating material and air supplies. The main air supply duct is indicated at 128. From this duct air enters and divides in condenser 129, one divided line 130 being connected to the valve connection 113 and the other into a condenser 131. The condenser 131 includes a regulator 132 and herein the air is again divided, one portion passing out through a line 133 connected with the valve connection 107 and the other through a line 134 leading into the coating material tank 135 where it provides a pressure head on the coating material and forces it through a pipe line 136 into the spray gun, through the inlet port 102 thereof.

Figure 7:
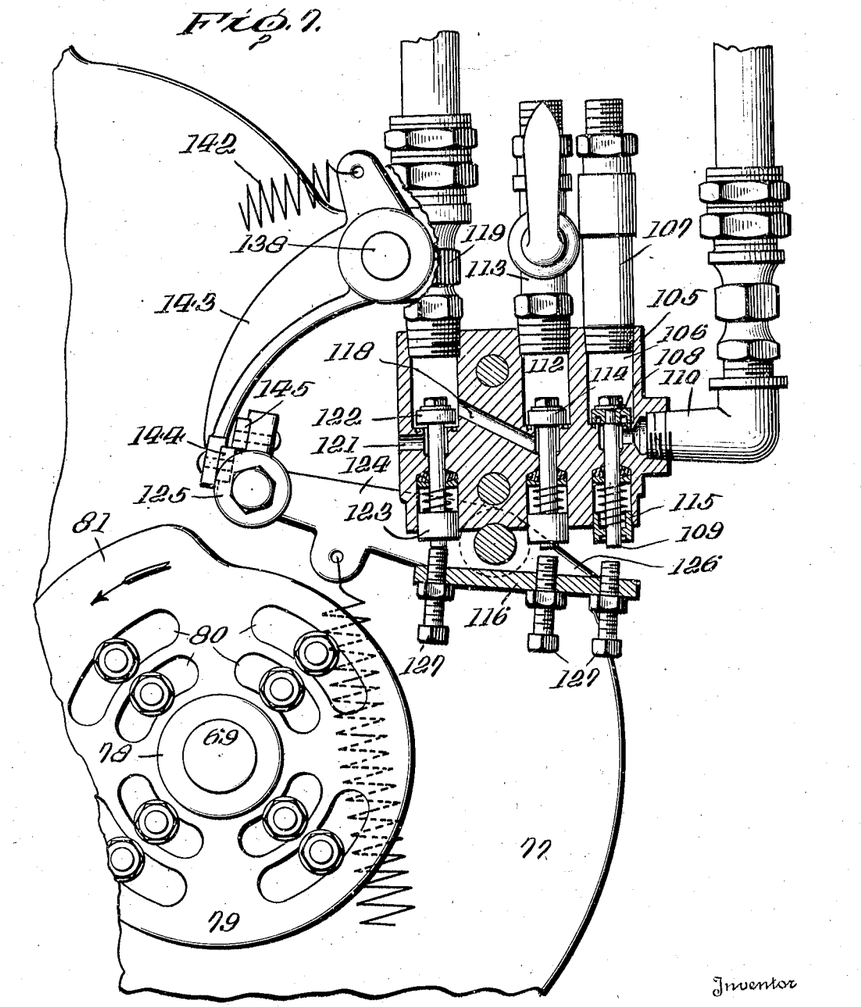
Figure 7 is a fragmentary end elevation illustrating the valve control lever locked in the elevated, "no-spray" position, the control valve mechanism being shown in section.
Figure 8:
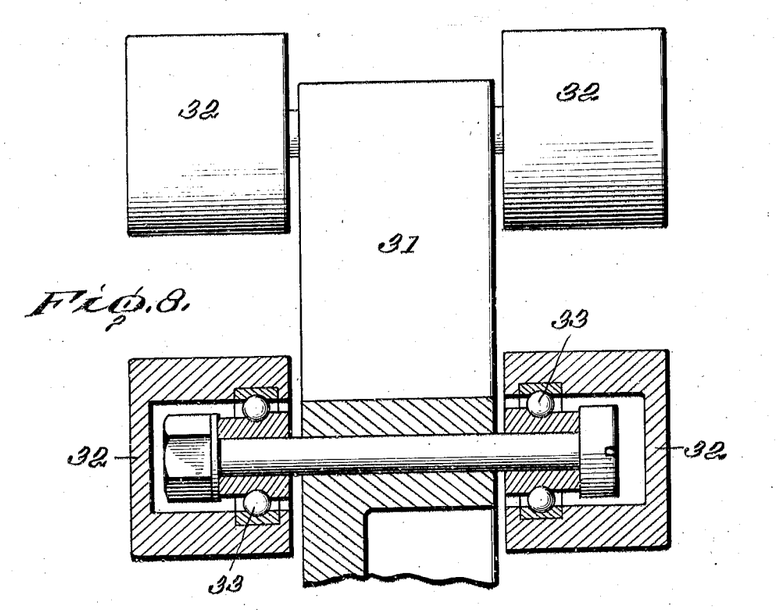
Figure 8 is a fragmentary sectional view illustrating one of the turret pockets.

It will be noted by reference to Figures 7 and 9 of the drawings that each time the actuator lever roller 125 rides the smaller diameter dwell of the cam plates 79 so as to effect an unseating of the valves 108 and 114, atomizing air will pass through the pipe lines 133 and 111 to the spray gun 52 for atomizing the coating material being sprayed therefrom. It will be understood that the coating material is forced through the needle valve of the gun by reason of the pressure head in the coating material container 135 and that the needle valve is unseated at this interval by air passing through pipe line 130, connection 113, chamber 112, duct 118, chamber 117, connection 119 and pipe line 120. When the actuator lever roller 125 again rides up on the cam crest portion 81 the positions of the valves will be reversed by the lowering of the tappets 109 and 115 and closing of the valves 108 and 114, and a lifting of the tappet 123 and an opening of the valve 122. The opening of the valve 122 permits pressure to bleed out of the pipe line 120 through the bleed port 121, enabling the seating of the spring seated needle valve for the purpose of discontinuing the spraying operation.

My improved apparatus includes a "no can, no spraying" equipment serving to prevent operation of the spraying mechanism whenever the turret pocket positioned at the spraying station does not contain a can body to be sprayed. This equipment includes a lever 137 secured on one end of a shaft 138 rockably supported as at 139, and this lever carries at its free end a roller 140 positioned to engage a can body mounted in the turret pocket at the spraying station, as shown in Figure 2 of the drawings. Should no can be present in this pocket the roller would drop down into the pocket to the extent permitted by the adjustable stop screw 141 and under the urge of a spring 142 anchored to the housing plate 77 and connected with a crank portion projecting from the shaft 138. See Figures 2 and 4 of the drawings.

At its opposite end the shaft 138 carries a latch lever 143 equipped at its free end with a latch lug 144 engageable under a similar lug 145 supported on the valve actuator lever 124. It will be noted by reference to Figures 1 and 2 of the drawings that the lever 127 projects into the housing 6 through an opening 146 formed therein.

Whenever the roller 140 is permitted to drop into the pocket by absence of a can body therein, as hereinbefore described, the latch lug 144 will be moved into position for intercepting downward movement of the latch lug 145 and lever roller 125, thus making it impossible for the roller to descend after it is disengaged by the cam crest 81. Thus, whenever a can body is absent from the turret pocket at the spraying station, it is impossible for the actuator lever 124 to move into position for lifting the valve tappets 109 and 115, and consequently no spraying action can take place.

In operation, the feed screw 16 feeds the can bodies one by one into the turret pockets 31. After each pocket 32 positioned to receive a can body from the screw 16 has its can body deposited therein, the turret is indexed to move that can body to the spray station at the top or vertical position of the turret, as indicated in Figure 2 of the drawings. The parts are so timed that indexing of the turret will not take place until the flat surface 22 on the screw delivery end is positioned as shown in Figure 2 of the drawings. The indexing of the turret takes place rapidly and the machine has a spray capacity of from fifty to one hundred cans per minute. When the turret is in its "at rest" position, having moved a previously deposited can body from the receiving station to the spraying station, it being assumed also that a previously sprayed can has by the same indexing of the turret been positioned at the suction station next succeeding the spraying station, the spray gun 52 will be projected into the can body at the spraying station and the suction tube 54 will simultaneously be projected into the previously sprayed can at the next succeeding station. The parts are preferably adjusted and timed so that the spray head moves into and slightly through the can body and starts to withdraw before the spraying takes place, the spraying being accomplished during the withdrawal of the gun. It is to be understood, however, that the manner of mounting of the cam plates 79 permits a 30° adjustment of the cam crest portions and the adjustment of the spraying operation is very flexible. The spraying operation can be timed to take place during the forward movement or during both forward and rearward movement, if desired.

The protective coating material is sprayed into the can bodies in finely divided or atomized form so as to assure smooth and even coating, and the suction tube, entering the can bodies just after completion of the spraying operation at the next succeeding station, draws out of the can body coating material suspended therein in the form of a mist or cloud, thus preventing the material from accumulating in irregular manner on the inner surfaces of the container bodies.

Should it be desired, an air pressure blast could be employed instead of suction, the invention being considered of such scope as to comprehend either type of air treatment.

After the can bodies have been successively coated and air treated to eliminate vapor suspension therein, they are discharged from the spray casing, as at 147, where they may be deposited upon any suitable off-take runway.

The spring-pressed ball and socket equipments 72, 71 and the free-mounting of the gear 70 on the hub of the cam end plate 67 constitute an overload clutch equipment which will serve to prevent breakage of parts in case any jamming of the machine should occur. Also, by provision of the clamp plate and ring equipments 84, 83, the Geneva lock 86 is secured to the cylinder cam 66 by friction, thus making it possible to accomplish a full cycle of adjustment for the purpose of lining up the turret 26 and the reciprocating rod 56 with the driving mechanisms.

As herein described, the machine is designed for the coating of can bodies open at both ends. It will be obvious, however, that should it be desired to interiorly coat can bodies closed at one end, this can be accomplished by merely substituting a cylinder cam 66 equipped to provide a shorter stroke to the reciprocating rod 56. It will be noted that the spray gun axis is disposed to one side of the axis of the can body with which it is aligned for coating purposes. Thus, when the cans equipped with a bottom closure are being sprayed, the spray can be made to engage the can bottom across the center thereof, thus avoiding conflicting fluid currents and assuring perfect coating of the bottom as well as the side wall surfaces.

It may be found desirable at times, depending upon the type of lacquer or other coating material being sprayed into the can bodies, to preheat the can bodies or the supply of coating material, or both the can bodies and the supply of coating material. Whenever this is desired, heat may be applied in any suitable manner to the coating material reservoir, and the can bodies may be pre-heated in any suitable manner, as by passing them circuitously through a chamber in which air heated to a temperature of say 110° F. is contained. Such an adaptation of the machine will be found very effective in spray-coating cans to be used in the packaging and baking of bread, in which instance the coating material is a suitable form of grease which will prevent sticking of the baked product in the package containers.

As has been hereinbefore stated, the movements of the feed screw 16 and the turret 26 are so timed that the flat end portion 22 of the screw will be positioned as shown in Figure 2 at the time indexing of the turret takes place. The surface 22 is of such length that it exercises a guiding influence on the can body being indexed with the adjacent turret pocket.

It is to be understood that the specific mechanisms herein described may be variously changed without departing from the spirit of the invention as defined in the appended claims.

I claim:

1. In can body spraying apparatus, a turret, rotatable step-by-step and having pockets therein for receiving individual can bodies, a housing encasing the turret for completely confining the spray and having an opening therein aligned with a stop station of the turret, a spray head reciprocable through said opening into and out of can bodies carried by said turret for spraying them internally, said housing having a second opening therein aligned with a succeeding stop station of the turret, and means movable in and out through the second opening for effecting removal of vapor suspended in a previously sprayed can body, and a common means for imparting movement to the spray head and the vapor removing means.

2. In can body spraying apparatus, a turret rotatable step-by-step and having pockets therein for receiving individual can bodies, a housing encasing the turret for completely confining the spray and having an aperture therein aligned with a stop station of the turret, a spray head reciprocable through said opening into and out of can bodies carried by said turret for spraying them internally, said housing having a second opening therein aligned with a succeeding stop station of the turret, and a suction tube reciprocable through the second opening into and out of can bodies carried by said turret for removing vapor suspended in sprayed can bodies.

3. In can body spraying apparatus, a turret for advancing can bodies, means for spraying the can bodies internally, and a suction tube reciprocable into and out of the can bodies to withdraw vapor suspended therein.

4. In can body spraying apparatus, a turret for advancing can bodies, and means including a spray head and a suction head reciprocable into and out of the can bodies for internally spraying the can bodies and for removing suspended vapor therefrom.

5. In can body spraying apparatus, a turret for advancing can bodies, means reciprocable into and out of the can bodies for internally spraying the can bodies and for removing suspended vapor therefrom, said last named means including a spray head and a suction tube disposed in spaced relation to enter separate can bodies, and common means for simultaneously reciprocating said head and tube.

6. In can body spraying apparatus, a turret rotatable step-by-step and having pockets therein for receiving individual can bodies having open ends defined by outwardly directed flanges, a housing encasing the turret for completely confining the spray and having an opening therein aligned with a stop station of the turret, a spray head reciprocable through said opening into and out of can bodies carried by said turret for spraying them internally, said housing having can body guiding ribs therein opposed to the turret pockets and engaged by the can body end flanges, and a rapidly rotating friction disk disposed to peripherally engage body portions of can bodies and hold them in the turret pockets for imparting rotation thereto at the spray stop station only.

7. In can body spraying apparatus, a pocketed turret rotatable step-by-step to present can bodies individually at a spray station, a spray head reciprocable into and out of a can body presented at the spray station, a rapidly rotating friction disk engaged by the spray station presented can body, and means for adjustably mounting and driving said disk including a driven shaft section, a bearing for said shaft section adjustable toward and from the turret periphery, a driver shaft section, and a coupling shaft section connected by universal joints with said driven and driver shaft sections.

8. In can body spraying apparatus, a turret for advancing can bodies, means for spraying the can bodies internally, a stationary suction duct, and a suction tube telescopically slidable on said duct and having an end portion reciprocable into and out of the can bodies for withdrawing vapor suspended therein.

9. In can body spraying apparatus, a pocketed turret for serially positioning can bodies at a spray station, spray means operable each time a can body is positioned at the station and including a control valve and an actuating lever movable from a spray means operating position to a spray means operating discontinuing position, rotary cam means for alternating the positions of the lever, and latch means engageable with the actuating lever to prevent movement to its spray means operating position and including a rock shaft, a latch arm on one end of the rock shaft, a control lever on the other end of said rock shaft and engaged by a can body at the spray station for holding the latch means ineffective and movable whenever a can body is absent from said station to rock the shaft and permit the latch arm to intercept and hold the actuating lever in its spray means operation discontinuing position.

10. In can body spraying apparatus, a pocketed turret rotatable step-by-step to present can bodies individually at a spray station, spraying means including a spray controlling valve and a valve actuating lever and a spray head reciprocable into and out of a can body presented at the spray station, and means including a rotatable cam having an actuating lever engaging portion including a dwell portion for holding the lever in the spray effecting position and which is adjustable as to the extent of the dwell and as to the position at which it contacts said lever for adjusting the duration and timing of the spraying interval.

11. In can body spraying apparatus, a pocketed turret rotatable step-by-step to present can bodies individually at a spray station, a spray head reciprocable into and out of a can body presented at the spray station, turret indexing means and spray head reciprocating means driven from a common source, means including a rotary cam and an engaging valve actuating lever for controlling spraying operation of said head, means for adjusting the turret indexing means relative to the spray head reciprocating means, and means for adjusting the periods of effective engagement between the cam and actuating lever.

12. In can body spraying apparatus, a pocketed turret for positioning can bodies, reciprocable spray head equipment including a reciprocable supporting rod, a rotary cam for imparting reciprocation to said rod, a plate frictionally secured to and adjustable about the axis of said cam and including a Geneva movement roller and a Geneva lock extension, and a star wheel connected to said turret and moved step-by-step by said roller and lock.

13. In can body spraying apparatus, a pocketed turret for positioning can bodies, reciprocable spray head equipment including a reciprocable supporting rod, a rotary cam for imparting reciprocation to said rod, a plate frictionally secured to and adjustable about the axis of said cam and including a Geneva movement roller and a Geneva lock extension, a star wheel connected to said turret and moved step-by-step by said roller and lock, and means for imparting rotation to the cam and including an overload release clutch equipment.

14. In can body spraying apparatus, a pocketed turret for positioning can bodies, a reciprocable spray head, turret indexing and spray head reciprocating means including a spring loaded overload release clutch, housing means for the turret and the reciprocating and indexing means, and means operable from without the housing for varying the load on said clutch loading spring equipment.

15. In can body spraying apparatus, a turret rotatable step-by-step and having equidistantly spaced peripheral can body receiving pockets, means for indexing the turret, a feed screw for feeding can bodies one by one into said pockets and including a flattened end face, and means for moving the screw in timed relation with the turret so as to present the flattened screw surface in opposition to the peripheral portion of the turret for guiding can bodies as the turret is indexed.

PAUL E. PEARSON.